(12) United States Patent
Tkac et al.

(10) Patent No.: US 10,887,724 B2
(45) Date of Patent: Jan. 5, 2021

(54) LOCATING A MOBILE DEVICE AND NOTIFYING A USER OF THE MOBILE DEVICE LOCATION

(71) Applicant: International Business Machines Corporation, Armonk, NY (US)

(72) Inventors: Vincent Tkac, Delaware, OH (US); Joshua M. Rice, Marysville, OH (US); Andrew C. Myers, Columbus, OH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/400,125

(22) Filed: May 1, 2019

(65) Prior Publication Data

US 2020/0351611 A1 Nov. 5, 2020

(51) Int. Cl.
*H04W 4/02* (2018.01)
*G06Q 20/32* (2012.01)
*H04W 64/00* (2009.01)

(52) U.S. Cl.
CPC .......... *H04W 4/023* (2013.01); *G06Q 20/325* (2013.01); *G06Q 20/3224* (2013.01); *H04W 64/003* (2013.01)

(58) Field of Classification Search
CPC ..... H04W 4/029; H04W 4/023; H04W 4/027; H04W 4/025; H04W 4/026; H04W 4/021; H04W 4/08; H04W 64/006; H04W 4/80; H04W 64/00; H04W 4/33; H04W 4/38; H04W 64/003; H04W 72/04; H04W 4/35; H04W 4/40; H04W 76/10; H04W 4/02; H04W 4/44; H04W 4/024; H04W 4/46; H04W 84/18; H04W 4/70; H04W 84/12; H04W 88/10; H04W 52/0212; H04W 40/20; H04W 40/18; H04W 4/046; H04W 4/30; H04W 4/42; H04W 8/08; G01S 5/0072; G01S 5/0263; G01S 5/0289; G01S 5/0284; G01S 5/0294; G01S 5/0027; G01S 19/46; G01S 5/0009; G01S 5/0242; G01S 5/14; G01S 2013/936; G01S 13/867;

(Continued)

(56) References Cited

U.S. PATENT DOCUMENTS 8,264,352 B2  9/2012  Holley et al.
8,773,275 B1* 7/2014  Parenteau ............... G01S 19/16
                                        340/539.13

(Continued)

FOREIGN PATENT DOCUMENTS

KR    1020160117975 A    10/2016

*Primary Examiner* — Nimesh Patel
(74) *Attorney, Agent, or Firm* — Anthony V. England; Edell, Shapiro & Finnan, LLC

(57) ABSTRACT

A method, a computing system, and a computer program product are provided. At least one processor receives a location of a mobile device. The location of the mobile device is compared to a location of an operator of a vehicle used to transport a user of the mobile device. In response to the vehicle reaching a destination and the location of the mobile device being within a threshold distance of the operator of the vehicle for a threshold amount of time, one or more from a group of the user of the mobile device, the operator of the vehicle, and a third party indicated by the user are notified, via the at least one processor, regarding the mobile device.

14 Claims, 9 Drawing Sheets

(58) Field of Classification Search
CPC .......... G01S 19/42; G01S 19/50; G01S 19/51;
G01S 5/02; Y02D 70/10; Y02D 70/12;
Y02D 70/122; Y02D 70/124; Y02D
70/126; Y02D 70/142; Y02D 70/144;
Y02D 70/164; Y02D 70/1224; Y02D
70/1226; Y02D 70/1242; Y02D 70/1262;
Y02D 70/14; Y02D 70/146; Y02D
70/162; Y02D 70/166; Y02D 70/22;
Y02D 70/00; Y02D 70/23; Y02D 70/26;
Y02D 70/20; Y02D 70/30; Y02D 70/32;
Y02D 70/34; Y02D 70/1264; Y02D
10/13; H04M 2250/10; H04M 1/72538;
H04M 1/72572; H04M 11/04; H04M
3/53; H04M 7/0048; H04M 7/0051;
H04M 7/0054; H04M 7/1235; H04M
7/1245; H04M 3/42374; H04M 1/72547;
H04M 1/72566; H04M 1/72527; G06Q
30/0261; G06Q 30/0267; G06Q 30/0281;
G06Q 10/08; G06Q 20/3224; G06Q
10/0833; G06Q 20/202; G06Q 20/327;
G06Q 50/30; G06Q 10/06; G06Q
30/0266; G06Q 10/107; G06Q 20/04;
G06Q 20/00; G06Q 30/0252; G06Q
30/0264; G06Q 30/0633; A45C 13/18;
G06F 16/95; G06F 21/88; G06F
2221/2111; G06F 16/29; G06F 19/00;
H04L 41/5064; H04L 63/102; H04L
63/107; H04L 67/18; H04L 67/10; H04L
67/306; H04L 67/42; H04L 63/0861;
H04L 67/104; H04L 67/20; H04L 43/08;
H04L 67/125; H04L 67/16; H04L 67/22;
H04L 41/5067; H04L 67/325; H04L
41/0681; H04L 51/38; H04L 51/00; H04L
1/1812; H04L 2463/102; H04L 63/061;
H04L 63/0853; H04L 41/0686; H04L
47/14; H04L 47/29; H04L 43/04; H04L
51/04; H04L 51/20; G08B 21/0202;
G08B 21/0208; G08B 21/0269; G08B
21/0277; G08B 21/0291; G08B 21/24;
G08B 25/014; G08B 25/08; G05D
1/0088; G05D 2201/0213; G05D 1/0246;
G05D 1/0297; G05D 1/0022; G05D
1/0278; G05D 2201/0216; G05D 1/0214;
G05D 1/0234; G05D 1/0282; G05D
1/0274; G05D 1/0287; G05D 1/0276;
G05D 1/0285; G05D 2201/0212; G05D
1/0016; G05D 1/021; G05D 1/0038;
G05D 1/0221; G05D 1/028; G05D
1/0027; B60K 2370/148; B60K 2370/21;
B60K 37/06; B60K 2370/161; B60K
2370/165; B60K 2370/1438; B60K
2370/145; B60K 2370/175; B60K
2370/176; B60K 2370/186; B60K
2370/1868; B60K 2370/55; B60K
2370/56; B60K 2370/566; B60K
2370/589; B60K 2370/73; B60K
2370/741; B60K 28/12; B60K 28/14;
B60W 50/14; B60W 30/00; B60W 30/09;
B60W 40/08; B60W 50/10; B60W
2040/0809; B60W 2040/089; B60W
2550/10; B60W 50/00; B60W 2040/0881;
B60W 2050/0075; B60W 2540/28; B60W
30/025; B60W 50/029; B60W 2050/022;
B60W 40/09; G07C 5/008; G07C 5/02;
G07C 5/0808; G07C 5/0841; G07C
9/00134; G07C 9/00; G07C 9/00563;
G07C 2209/08; G07C 9/00079; G07C
9/00119; G07C 9/00158; G07C 9/00904;
G07C 5/0816; G07C 9/00111; G06K
9/00288; G06K 2009/00738; G06K
2009/2045; G06K 9/00228; G06K
9/00248; G06K 9/00355; G06K 9/00664;
G06K 9/00838; G06K 9/00845; G06K
9/20; G06K 9/46; G06K 9/6202; B60R
25/24; B60R 21/0132; B60R 21/01512;
B60R 2325/101; B60R 2325/205; B60R
25/102; B60R 25/241; B60R 25/30; B60R
25/305; G08G 1/20; G08G 1/096775;
G08G 1/0962; G08G 1/161; G08G 1/123;
G08G 1/0968; G08G 1/096816; G08G
1/096827; G08G 1/127; G08G 1/162;
G08G 1/164; G08G 1/202; G08G 1/205
See application file for complete search history.

(56) References Cited

U.S. PATENT DOCUMENTS

| | | | |
|---|---|---|---|
| 9,117,373 B2 | 8/2015 | Hatton | |
| 10,085,121 B1* | 9/2018 | Chokshi | ............ G08B 21/0277 |
| 10,303,961 B1 | 5/2019 | Stoffel et al. | |
| 2011/0313804 A1* | 12/2011 | Camp | ................ G06Q 10/02 |
| | | | 705/7.13 |
| 2012/0041675 A1 | 2/2012 | Juliver et al. | |
| 2014/0327518 A1 | 11/2014 | Loutit | |
| 2016/0174023 A1 | 6/2016 | Cavallaro et al. | |
| 2016/0332535 A1 | 11/2016 | Bradley et al. | |
| 2017/0263123 A1 | 9/2017 | Sachdev et al. | |
| 2018/0075538 A1* | 3/2018 | Konrardy | ............... G06Q 40/08 |
| 2018/0106627 A1 | 4/2018 | Gupta et al. | |
| 2018/0211228 A1 | 7/2018 | Narayan et al. | |
| 2018/0220309 A1* | 8/2018 | Gomes | ................. H04W 24/02 |
| 2018/0223584 A1 | 8/2018 | Bradley et al. | |
| 2018/0227393 A1* | 8/2018 | Daub | ...................... H04L 67/20 |
| 2018/0288568 A1* | 10/2018 | Pao | ........................ H04W 4/023 |
| 2018/0293872 A1 | 10/2018 | Guo et al. | |
| 2018/0359604 A1 | 12/2018 | Chen et al. | |
| 2019/0090094 A1 | 3/2019 | Chokshi et al. | |
| 2019/0095714 A1 | 3/2019 | Wilcox et al. | |
| 2019/0197325 A1* | 6/2019 | Reiley | ............... G06K 9/00832 |
| 2019/0206223 A1 | 7/2019 | Hwang et al. | |
| 2019/0300020 A1* | 10/2019 | Alexiou | .................... G05B 9/00 |
| 2020/0005044 A1 | 1/2020 | Nakamura | |
| 2020/0109957 A1 | 4/2020 | Shiga et al. | |
| 2020/0110404 A1 | 4/2020 | Shiga et al. | |

* cited by examiner

ENTER HOW YOU WISH TO RECLAIM YOUR MOBILE DEVICE

PICKUP
DELIVER

PLEASE SELECT AN ADDRESS FOR RECLAIMING MOBILE DEVICE

● 123 MAIN ST., ANYTOWN, ANYSTATE

○ 456 MAPLE AVE., WEST ANYTOWN, ANYSTATE

FIG.7

ENTER HOW YOU WISH TO RECLAIM YOUR MOBILE DEVICE

PICKUP

DELIVER

PLEASE SELECT AN ADDRESS FOR DELIVERY OF MOBILE DEVICE

45 BALTIC AVE., MYTOWN, MYSTATE

PLEASE ENTER CREDIT CARD NUMBER AND AMOUNT $ -

FIG.8

LOCATING A MOBILE DEVICE AND NOTIFYING A USER OF THE MOBILE DEVICE LOCATION

BACKGROUND

1. Technical Field

Present invention embodiments relate to determining a location of a mobile device. More particularly, the present invention embodiments relate to alerting a mobile device user and an operator of a vehicle for hire that the mobile device user left the mobile device in the vehicle for hire after exiting the vehicle for hire at the destination and facilitating recovery of the mobile device by the mobile device user.

2. Discussion of the Related Art

Many users of mobile devices inadvertently leave their mobile devices behind in vehicles for hire upon exiting the vehicles for hire at their destinations. Operators of the vehicles for hire may be unaware that a mobile device was left behind in their vehicles and may not discover the mobile device until hours later. In some cases, a later passenger may discover the mobile device and may take possession of the mobile device upon leaving the vehicle for hire without mentioning a presence of the mobile device to the operator. Even in cases in which an operator discovers the mobile device and a user later realizes that the mobile device was left behind in the vehicle for hire, the user and the operator may not know how to contact each other to arrange for recovery of the mobile device by the user. As a result, the user or his or her business may replace the mobile device at great expense.

SUMMARY

According to one embodiment of the present invention, a method of locating a mobile device is provided. At least one processor receives a location of a mobile device and compares the location of the mobile device to a location of an operator of a vehicle used to transport a user of the mobile device. In response to the vehicle reaching a destination and the location of the mobile device being within a threshold distance of the location of the vehicle for a threshold amount of time, one or more from a group of the user of the mobile device, the operator of the vehicle, and a third party indicated by the user are notified via the at least one processor.

According to a second embodiment, a computing system is provided for executing a service for a user to determine a location. The computing system includes at least one processor and a memory. The at least one processor is configured to receive a location of the mobile device and compare the location of the mobile device to a location of an operator of a vehicle used to transport the user of the mobile device. In response to the vehicle reaching a destination and the location of the mobile device being within a threshold distance of the location of the operator for a threshold amount of time, one or more from a group of the user of the mobile device, the operator of the vehicle, and a third party indicated by the user are notified regarding the mobile device via the at least one processor.

According to a third embodiment, a computer program product including at least one computer readable storage medium is provided. The computer readable storage medium has computer readable program code embodied therewith for execution on at least one processor of a computing device. The computer readable program code is configured to be executed by the at least one processor such that the at least one processor receives a location of a mobile device and compares the location of the mobile device to a location of an operator of a vehicle used to transport a user of the mobile device. In response to the vehicle reaching a destination and the location of the mobile device being within a threshold distance of the location of the operator for a threshold amount of time, at least one from a group of the user of the mobile device, the operator of the vehicle, and a third party indicated by the user are notified regarding the mobile device via the at least one processor.

BRIEF DESCRIPTION OF THE DRAWINGS

Generally, like reference numerals in the various figures are utilized to designate like components.

FIG. 7 shows an example display screen for a user to indicate how and where the user wishes to reclaim a mobile device left behind in a vehicle according to an embodiment of the present invention.

FIG. 8 shows the example display screen of FIG. 7 after the user indicated a desire for having the mobile device delivered to a particular address according to an embodiment of the present invention.

DETAILED DESCRIPTION

In some embodiments, a user who desires a vehicle for hire may use an app, or an application, executing on a smartphone, a tablet, a laptop, or other mobile computing device to request a vehicle for hire. The vehicle for hire may be a taxi or an on-demand vehicle for hire. The user may request the vehicle for hire and may provide, to a car service, a destination and either the user or the mobile device may provide a pickup location for the user to the car service. Alternatively, instead of using an app or an application, the user may log into the car service via a browser executing on the mobile device to request the vehicle for hire.

In this specification, the term, "car service" is to be construed broadly to include a service associated with cars or other vehicles.

After receiving the request, the car service may provide identifying information regarding the driver and the vehicle for hire, as well as an estimated time of arrival, to the user via the app, the application, or the browser. Alternatively, the identifying information and the estimated time of arrival may be provided to the user via email, short message service (SMS), or other methods.

After the user is driven in the vehicle for hire to a destination, the operator of the vehicle for hire may indicate to a server of the car service that the destination has been reached. Alternatively, a vehicle for hire location reporting device may indicate to the server that the destination has been reached. In some embodiments, upon receiving this indication, the server may send a monitoring indication to the mobile device to monitor and report its location to the server for a predefined time period such as, for example, one minute, three minutes, or another time period, provided that the user previously authorized such monitoring.

During this predefined time period, the server may receive location reports from the mobile device and from the vehicle for hire or a mobile device of the operator. If, at the end of the predefined time period, the server determines that the mobile device and the operator or the vehicle for hire are within a threshold distance of each other, then the server may assume that the user left the mobile device behind in the vehicle for hire and may notify one or more of the operator, the user of the mobile device, or a third party regarding the mobile device. The user or the third party may be provided with information regarding the mobile device and contact information for the operator and/or the car service. The operator may be provided with contact information regarding the user or the third party.

Figure 1:
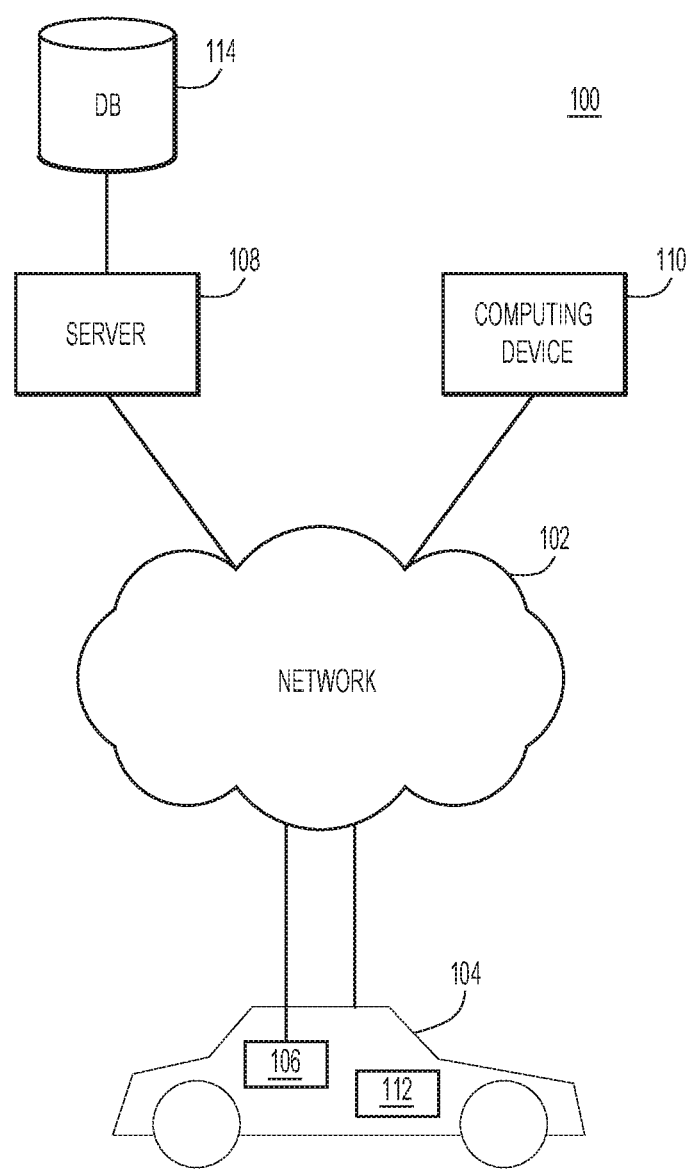
FIG. 1 illustrates an example environment in which embodiments may operate.

FIG. 1 illustrates an example environment 100 in which the present invention embodiments may operate. Environment 100 may include a network 102, a server 108, a computing device 110, a mobile device 106 in a vehicle for hire 104, and a vehicle for hire location reporting device 112 within vehicle for hire 104. Computing device 110 and server 108 may be connected to network 102 via a wired or wireless connection. Mobile device 106 and vehicle for hire location reporting device 112 may be connected to network 102 via a wireless connection.

Network 102 may be implemented by any number of any suitable communications media (e.g., wide area network (WAN), local area network (LAN), Internet, Intranet, etc.) or any combination thereof.

Computing device 110 and server 108 may communicate with each other via network 102. In this specification, a reference to server 108 can be interpreted as referring to either a single server or multiple servers in a server farm.

Mobile device 106 may be a handheld computing device, a tablet computing device, a smartphone, a laptop computing device, or other type of mobile computing device. Mobile device 106 and server 108 may communicate with each other via network 102.

Vehicle for hire location reporting device 112 may include a GPS sensor of an operator of a vehicle for hire or either a fixed or removable location reporting device in vehicle for hire 104. Vehicle for hire location reporting device 112 and server 108 may communicate with each other via network 102.

Database 114 may be implemented by any conventional or other database or storage unit, may be local to or remote from server 108, and may communicate with server 108 via any appropriate communication medium (e.g., local area network (LAN), wide area network (WAN), Internet, hardwire, wireless link, Intranet, etc.).

Server 108, computing device 110, mobile device 106 and vehicle for hire location reporting device 112 may be implemented by any conventional or other computer system.

Figure 2:
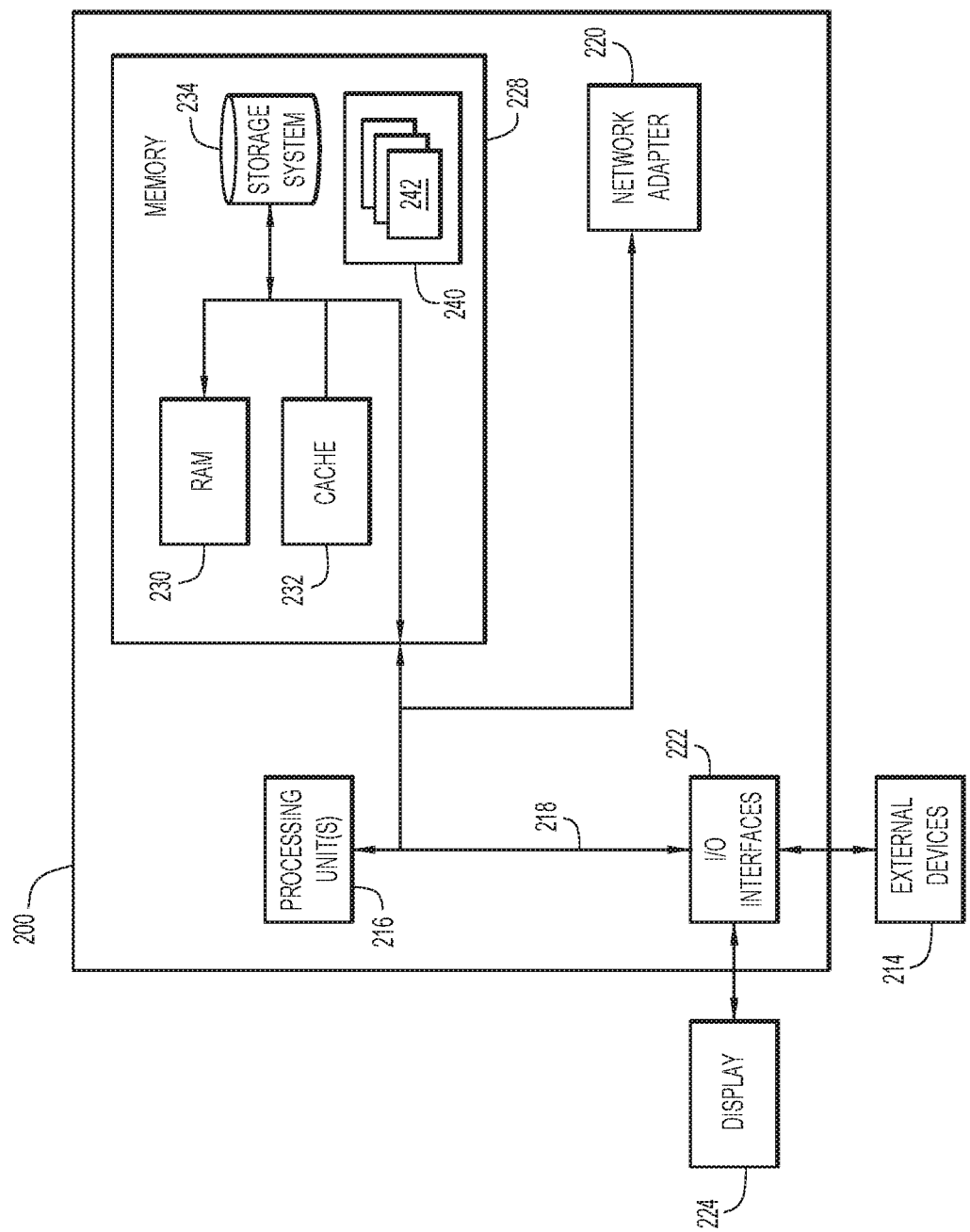
FIG. 2 is a functional block diagram of a computing device that may be used to implement various embodiments.

Referring now to FIG. 2, a schematic of an example computer system 200 is shown, which may implement any of server 108, computing device 110, mobile device 106 and vehicle for hire location reporting device 112 in various embodiments. Computer system 200 is shown in a form of a general-purpose computing device. Components of computer system 200 may include, but are not limited to, one or more processors or processing units 216, a system memory 228, and a bus 218 that couples various system components including system memory 228 to one or more processing units 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 200 may include a variety of computer system readable media. Such media may be any available media that is accessible by computer system 200, and may include both volatile and non-volatile media, removable and non-removable media.

System memory 228 can include computer system readable media in the form of volatile memory, such as random access memory (RAM) 230 and/or cache memory 232.

Computer system 200 may further include other removable/non-removable, volatile/non-volatile computer system storage media. By way of example only, storage system 234 can be provided for reading from and writing to a non-removable, non-volatile magnetic medium (not shown, which may include a "hard drive" or a Secure Digital (SD) card). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, the one or more application programs, the other program modules, and the program data or some combination thereof, may include an implementation of a networking environment. Program modules 242 generally carry out the functions and/or methodologies of embodiments of the invention as described herein.

Computer system 200 may also communicate with one or more external devices 214 such as a keyboard, a pointing device, one or more displays 224, one or more devices that enable a user to interact with computer system 200, and/or any devices (e.g., network card, modem, etc.) that enable computer system 200 to communicate with one or more other computing devices. Such communication can occur via Input/Output (I/O) interfaces 222. Still yet, computer system 200 can communicate with one or more networks such as a local area network (LAN), a general wide area network (WAN), and/or a public network (e.g., the Internet) via network adapter 220. As depicted, network adapter 220 communicates with the other components of computer system 200 via bus 218. It should be understood that, although not shown, other hardware and/or software components could be used in conjunction with computer system 200. Examples, include, but are not limited to: a microphone, one or more speakers, microcode, device drivers, redundant processing units, external disk drive arrays, RAID systems, tape drives, and data archival storage systems, etc.

Figure 3:
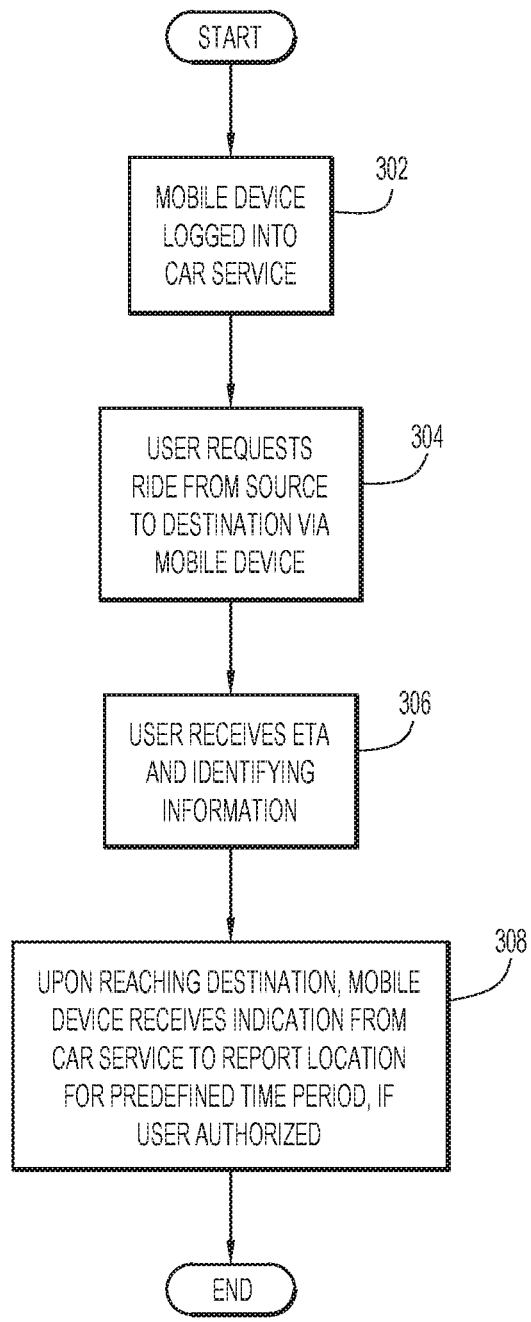
FIG. 3 is a flowchart that illustrates an example process for requesting a vehicle via use of a mobile device according to an embodiment of the present invention.

FIG. 3 is a flowchart illustrating an example process that may be performed on mobile device 106 of a user. The process may begin with a user logging into a car service via mobile device 106 (act 302). The user may log into the car service via an app or an application executing on mobile device 106 and communicating with server 108 via network 102. Alternatively, the user may log into the car service via a web browser executing on mobile device 106 and communicating with server 108 via network 102.

The user may log into the car service by providing, for example, a user ID and authenticating information associated with a previously established car service account. The authenticating information may include, but not be limited to, a password, a voice of the user, a fingerprint of the user, or a retinal scan of the user. The user may have previously created a user profile associated with the car service account. The user profile may include, but not be limited to, a name of the user, an address of the user, a credit card of the user, a phone number of the user, contact information for electronically contacting the user, a name of a third party associated with the user, a phone number of the third-party, and contact information for electronically contacting the third-party. In some embodiments, the user profile may indicate whether or not the user authorizes the car service to track a location of a mobile device of the user for a threshold period of time upon reaching a destination of the user riding in a vehicle of the car service.

When the user is logged into the car service, the user may request a ride by providing a source, or pickup location, and a destination location via the mobile device (act 304). After requesting the ride, the user may receive from the car service an estimated time of arrival (ETA) of a vehicle and identifying information, which may include, but not be limited to, a year, make, model and color of the vehicle, a tag number of the vehicle, a name of an operator of the vehicle, and an image of the operator (act 306).

When the vehicle arrives at the pickup location, the user may enter the vehicle and be driven to the destination provided by the user. Upon reaching the destination, if the user previously authorized tracking of the mobile device, the mobile device may receive an indication to report its location to the car service for a threshold period of time (act 308). The indication may be received by mobile device 106 from server 108 via network 102, or from a device within the vehicle such as, vehicle for hire location reporting device 112 or another device. Alternatively, mobile device 106 may monitor its own location, and upon determining that the mobile device is located within a predefined distance of the destination, begin reporting its own location to server 108. Mobile device 106 may periodically report its location to server 108 every ten seconds or another suitable time interval for a threshold period of time. The threshold period of time may be predefined to be one minute, two minutes, three minutes, or another suitable threshold period of time.

Figure 4:
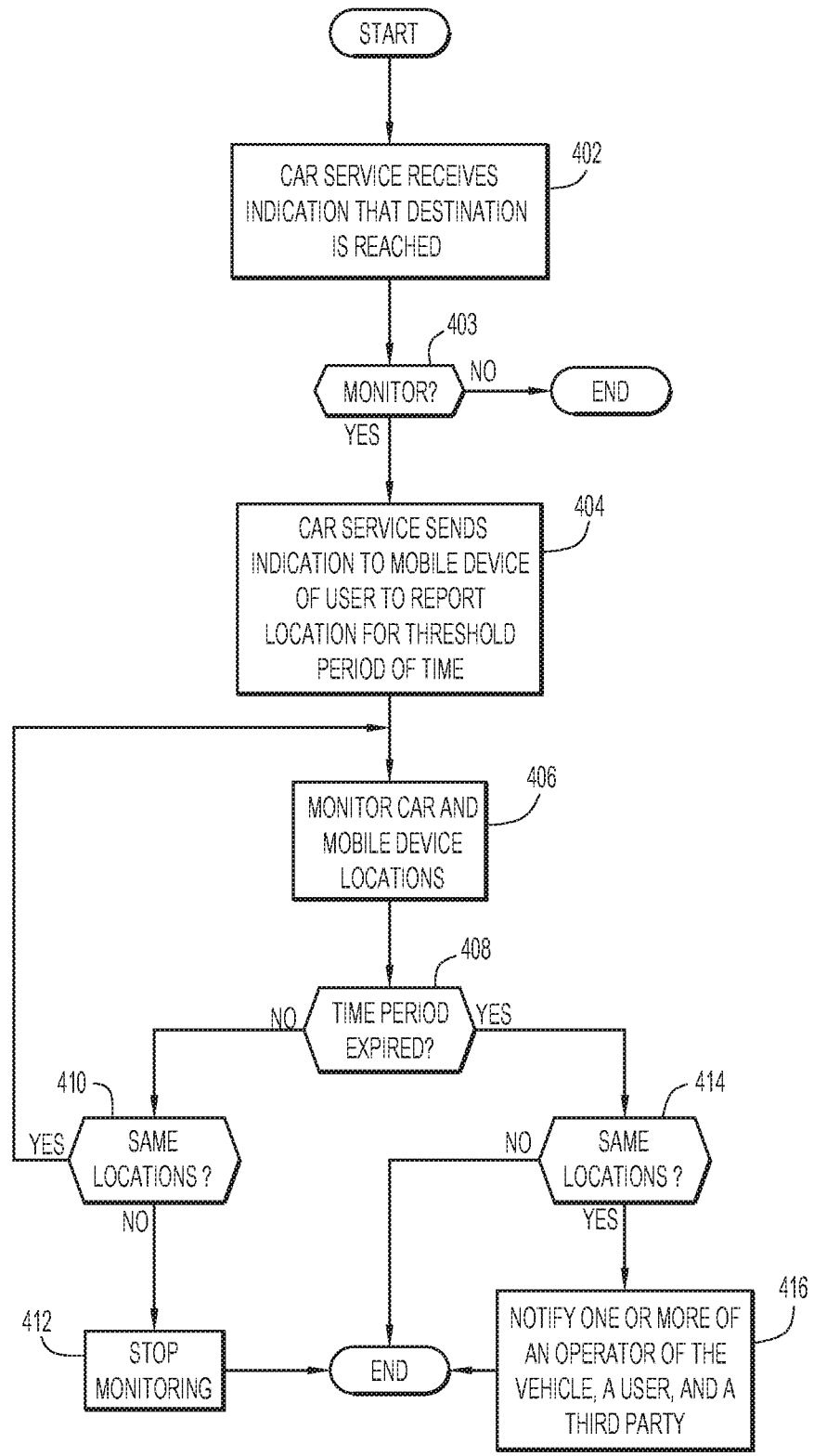
FIG. 4 shows an example process that may be performed when a vehicle in which a user of a mobile device is riding has reached a destination according to an embodiment of the present invention.

FIG. 4 is a flowchart of an example process performed by server 108 of a car service. The process may begin with server 108 receiving an indication that a user has just reached a destination via the car service (act 402). Server 108 may then determine whether the user authorized monitoring of mobile device 106 for a threshold period of time (act 403). If the user had not authorized the monitoring, then the process is completed.

If, during act 403, server 108 determined that the user had authorized the monitoring of the mobile device, then server 108 may send an indication to mobile device 106 for mobile device 106 to begin reporting its location to server 108 for the threshold period of time (act 404). As previously mentioned, the threshold period of time may be one minute, two minutes, three minutes, or another suitable threshold period of time.

Server 108 may receive location reports from mobile device 106 and vehicle for hire location reporting device 112 (act 406). A determination may be made by server 108 regarding whether the threshold period of time has expired (act 408). If the threshold period of time has been determined not to have expired, then server 108 may determine whether vehicle 104 and mobile device 106 are located within a threshold distance of each other (act 410). If vehicle 104 and mobile device 106 are determined to be within the threshold distance of each other, then acts 406-408 may be repeated. Otherwise, server 108 may stop monitoring the location of mobile device 106 (act 412).

If, during act 408, server 108 determines that the threshold time period has expired, then server 108 may determine whether vehicle 104 and mobile device 106 are within the threshold distance of each other (act 414). If server 108 determines that vehicle 104 and mobile device 106 are not within the threshold distance of each other, then the process may be completed. Otherwise, server 108 may notify one or more of an operator of vehicle 104, a user of mobile device 106, and a third party whose information may have been entered into a profile of the user in an online account of the car service (act 416).

In some embodiments, during act 416, server 108 may send an indication to the mobile device 106 to emit a sound to alert the operator of vehicle 104 that the user left mobile device 106 behind when he or she left vehicle 104.

Figure 5:
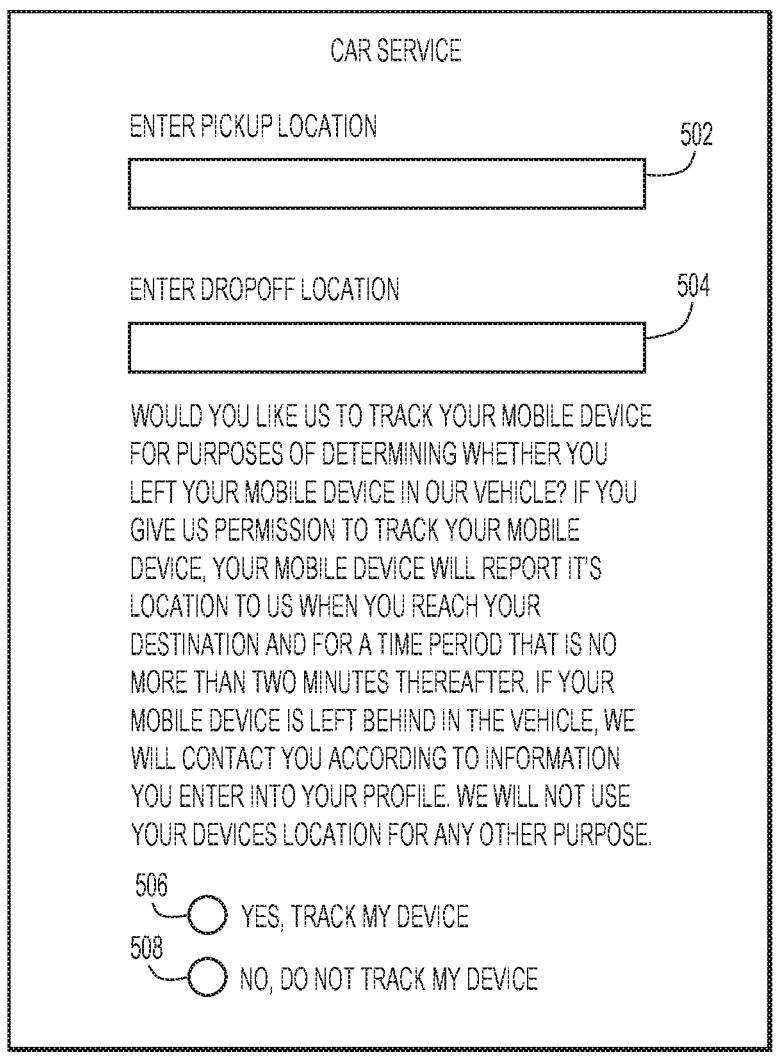
FIG. 5 illustrates an example display screen for a user to provide a desired pickup location and drop off location regarding a requested ride and to indicate whether the user authorizes location tracking of a mobile device for a threshold amount of time upon reaching a destination according to an embodiment of the present invention.

FIG. 5 illustrates an example display screen 500 on mobile device 106 when a user requests a ride via a car service. The display screen may be displayed by an app or an application executing on mobile device 106 or via a web browser executing on mobile device 106 and logged into a user account on server 108 of the car service. To request a ride from the car service, the user may provide, at 502, a location at which he or she is to be picked up and, at 504, a location at which he or she is to be dropped off. The location may include a street address or place name such as, for example, a restaurant name, a movie theater name, an airport name, a shopping mall name, etc. Further, the user may indicate whether he or she authorizes location tracking of mobile device 106 for a threshold amount of time after vehicle 104 reaches the destination. The user may authorize the location tracking by selecting indicator 506 and may deny authorization for the location tracking by selecting indicator 508.

In various embodiments, the user may provide information to a user profile associated with the user's car service account. The user profile may include a user's name as well as other information.

Figure 6:
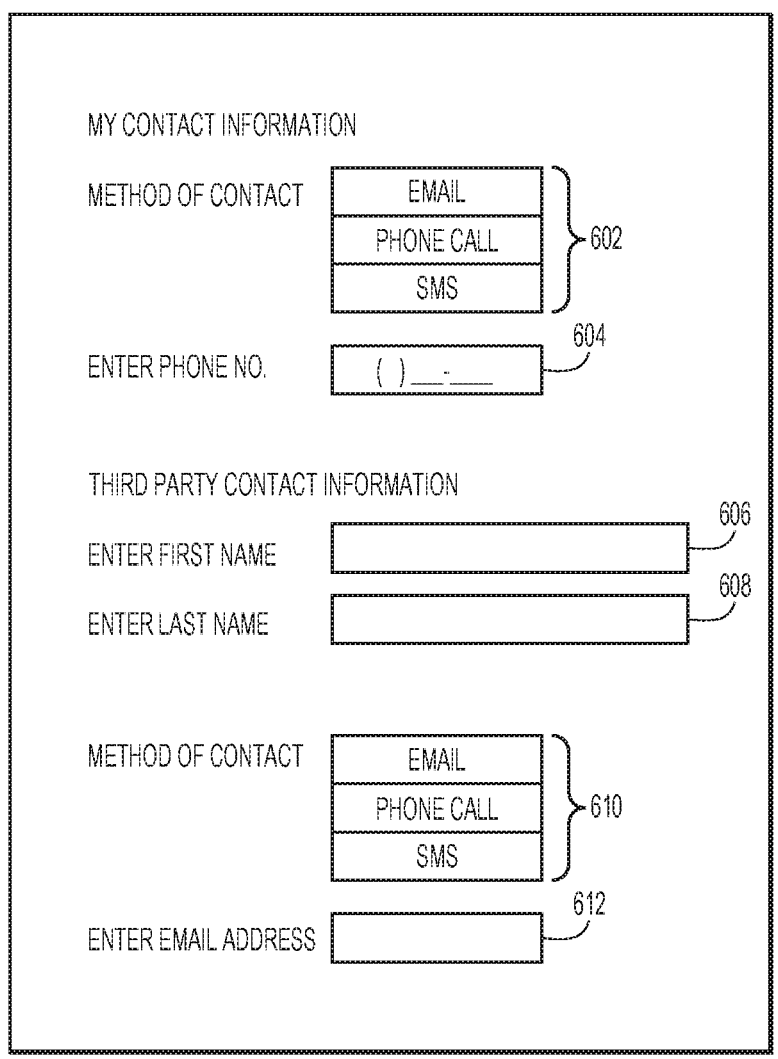
FIG. 6 illustrates an example display screen for a user to provide contact information to be used when the user leaves a mobile device behind in a vehicle for hire according to an embodiment of the present invention.

FIG. 6 shows an example display screen 600 that may be displayed by mobile device 106 executing an app, an application, or a web browser connected to server 108 of the car service after the user has logged into the service. The user may select a preferred method by which he or she wishes to be contacted at 602. Display 600 of FIG. 6 shows three methods from which the user may select for being contacted. The methods may include email, a phone call, and a short message service (SMS) message otherwise known as a text message. In other embodiments, more or fewer contacting methods may be provided.

In display screen 600, the user selected SMS, which may cause a space 604 to appear on display screen 600 for entry of a phone number or other identifying information of a device capable of communicating via the SMS. Had the user selected email act 602, then a space for the user to enter an email address would appear on display screen 600 at 604. If instead, the user selected phone call at 602, then a space for the user to enter a phone number would appear at 604 of display screen 600.

Further, on display screen 600, the user may enter a first name and a last name of a third party to contact at 606 and 608, respectively, regarding a mobile device left behind in a vehicle for hire. The user also may enter a method of contact, such as email, phone call, or SMS 610 similar to method of contact 602 for contacting the third party.

In display screen 600, the user selected email at 610, which may cause a space 612 to appear on display screen 600 for entry of an email address of the third party. Had the user selected phone call at 610, then a space for the user to enter a phone number of the third party would appear on display screen 600 at 612. If instead, the user selected SMS at 610, then a space for the user to enter a phone number of a device capable of receiving a SMS message would appear at 612 of display screen 600.

After leaving mobile device 106 behind in a vehicle, the user may indicate a desire to reclaim mobile device 106 via an app or an application executing on a computing device such as, for example, computing device 110, or by using a web browser executing on a computing device such as, for example, computing device 110, and logging into a car service account of the user. FIG. 7 shows an example display screen for prompting the user to indicate whether the user desires to pick up mobile device 106 or have mobile device 106 delivered to the user or a third party. If the user indicates the desire to pick up the mobile device, the user may be prompted to indicate an address from one or more possible pick up addresses of the car service. In one embodiment, the user may select the address by using a touch screen and touching a displayed indicator corresponding to a desired address or by selecting the desired address or the indicator via a pointing device. Had the user requested that mobile device 106 be delivered, the user may be prompted to provide a delivery address for delivering mobile device 106 as shown in FIG. 8. If the user provides the delivery address, the user may provide a credit card number and a monetary amount to compensate whoever delivers mobile device 106. In some embodiments, the car service may charge a set fee for delivery of mobile device 106. If the user provides the delivery address, the car service may contact the user regarding an approximate time for delivery of mobile device 106.

In some embodiments, after requesting delivery of mobile device 106, the user may execute an app, or application, on a computing device such as, for example, computing device 110, or the user may log into his or her car service account via a web browser executing on the computing device and request a current location of mobile device 106. In response to requesting the current location of mobile device 106, the computing device may display a map with an indicator marking a current location of a delivery vehicle carrying mobile device 106 for delivery.

Figure 9:
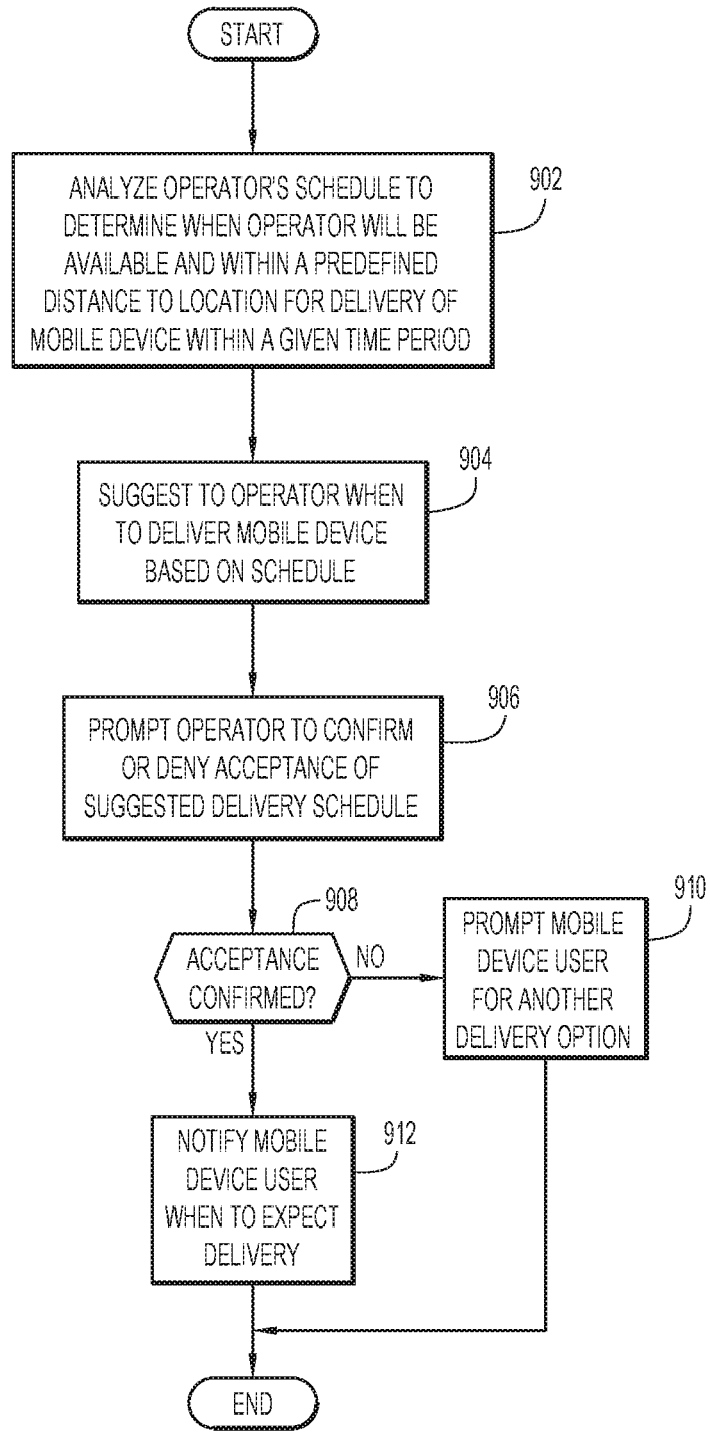
FIG. 9 is a flowchart that illustrates an example process for analyzing a vehicle operator's schedule and suggesting a time for delivering a mobile device left behind in the vehicle according to an embodiment of the present invention.

FIG. 9 is a flowchart of an example process, which may be performed in some embodiments, for analyzing a schedule of an operator of a vehicle having mobile device 106 left behind by a user after exiting vehicle 104. The process may be performed by server 108 or by a mobile computing device of the operator or a computing device of the vehicle.

The process may begin by analyzing a schedule of the operator to determine when, within a given time period such as 4 hours, 1 day, 3 days, or another time period, the operator will be available and within a predefined distance of a delivery address for mobile device 106 (act 902). The predefined distance may be 5 miles, 10 miles, or another suitable distance.

Assuming that such a time is found as a result of the analyzing, a notification may be provided to the operator suggesting the time for delivering mobile device 106 to the delivery address (act 904). The operator then may be prompted to confirm acceptance of the suggested time (act 906). If the operator confirms the suggested time (act 908), then the user of mobile device 106 may be notified as to when to expect mobile device 106 to be delivered (act 912). Otherwise, if the operator does not confirm acceptance of the suggested time (act 908), then the user of mobile device 106 may be notified and prompted to provide another delivery option (act 910).

It will be appreciated that the embodiments described above and illustrated in the drawings represent only a few of the many ways of implementing embodiments for notifying a mobile device user of a mobile device left behind in a vehicle.

The environment of the present invention embodiments may include any number of computer or other processing systems (e.g., client or end-user systems, server systems, etc.) and databases or other repositories arranged in any desired fashion, where the present invention embodiments may be applied to a number of desired types of computing environment (e.g., cloud computing, client-server, network computing, mainframe, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, profile generation module, profile comparison module, etc.). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method of locating a mobile device comprising:
monitoring, via at least one processor, location information of a vehicle received from a vehicle location reporting device included in the vehicle used to transport a user of the mobile device to a destination, the at least one processor being remotely located from the vehicle, wherein the user of the mobile device is a passenger in the vehicle prior to reaching the destination;
monitoring, via the at least one processor, location information of the mobile device received from the mobile device for up to a threshold amount of time after the vehicle reaches the destination;
comparing, via the at least one processor, the received location information from the vehicle with the received location information from the mobile device to determine whether the mobile device remained within a threshold distance of a location of the vehicle for the threshold amount of time after reaching the destination;
in response to the determining that the mobile device remained within the threshold distance of the location of the vehicle for the threshold amount of time after reaching the destination, notifying, via the at least one processor, one or more from a group of the user of the mobile device, an operator of the vehicle, and a third party indicated by the user regarding the mobile device;
tendering payment, via the at least one processor, for delivery of the mobile device to a location associated with the user; and
analyzing, via the at least one processor, a schedule of the operator with respect to use of the vehicle and determining a time to deliver the mobile device based on the schedule.

2. The method of claim 1, wherein the notifying the third party enables communication between the operator and the user.

3. The method of claim 1, wherein the notifying the user further comprises:
transmitting a communication to the user including contact information for the operator.

4. The method of claim 1, further comprising:
authorizing, via the at least one processor, a fee for delivery of the mobile device to the location associated with the user.

5. The method of claim 1, wherein the vehicle is a vehicle for hire.

6. The method of claim 1, wherein the vehicle is an on-demand vehicle for hire via a user computing device.

7. A computing system for executing a service for a user of a mobile device to determine a location of the mobile device, the computing system comprising:
at least one processor; and
a memory, wherein the at least one processor is configured to:
monitor location information of a remotely located vehicle received from a vehicle location reporting device included in the vehicle used to transport the user of the mobile device to a destination, wherein the user of the mobile device is a passenger in the vehicle prior to reaching the destination;
monitor location information of the mobile device received from the mobile device for up to a threshold amount of time after the vehicle reaches the destination;
compare the received location information from the vehicle with the received location information from the mobile device to determine whether the mobile device remained within a threshold distance of a location of the vehicle for the threshold amount of time after reaching the destination;
in response to the determining that the mobile device remained within the threshold distance of the location of the vehicle for the threshold amount of time after reaching the destination, notify one or more from a group of the user of the mobile device, the operator of the vehicle, and a third party indicated by the user regarding the mobile device;
tender payment to the operator of the vehicle to deliver the mobile device to a location associated with the user; and
analyze a schedule of the operator with respect to use of the vehicle and determine a time to deliver the mobile device based on the schedule.

8. The computing system of claim 7, wherein the at least one processor being configured to notify the third party enables communication between the operator and the user.

9. The computing system of claim 7, wherein the at least one processor being configured to notify the user further comprises:
the at least one processor being configured to transmit a communication to the user including contact information for the operator.

10. The computing system of claim 7, wherein the at least one processor is further configured to:
authorize a fee for delivery of the mobile device to the location associated with the user.

11. A computer program product for a user of a mobile device to determine a location of the mobile device, the computer program product comprising at least one computer readable storage medium having computer readable program code embodied therewith for execution on at least one processor of a computing device, the computer readable program code being configured to be executed by the at least one processor to:
monitor location information of a remotely located vehicle received from a vehicle location reporting device included in the vehicle used to transport the user of the mobile device to a destination, wherein the user of the mobile device is a passenger in the vehicle prior to reaching the destination;
monitor location information of the mobile device received from the mobile device for up to a threshold amount of time after the vehicle reaches the destination;
compare the received location information from the vehicle with the received location information from the mobile device to determine whether the mobile device remained within a threshold distance of a location of the vehicle for the threshold amount of time after reaching the destination;
in response to the determining that the mobile device remained within the threshold distance of the location of the vehicle for the threshold amount of time after reaching the destination, notify one or more from a group of the user of the mobile device, the operator of the vehicle, and a third party indicated by the user regarding the mobile device;
tender payment to the operator of the vehicle to deliver the mobile device to a location associated with the user; and
analyze a schedule of the operator with respect to use of the vehicle and determine a time to deliver the mobile device based on the schedule.

12. The computer program product of claim 11, wherein the computer readable program code is further configured to be executed by the at least one processor to:
authorize a fee for delivery of the mobile device to the location associated with the user.

13. The computer program product of claim 11, wherein the vehicle is an on-demand vehicle for hire via a user computing device.

14. The computer program product of claim 11, wherein the computer readable program code being configured to be executed by the at least one processor to notify the user further comprises the computer readable program code being further configured to be executed by the at least one processor to:
transmit a communication to the user including contact information for the operator.

* * * * *